US010352459B2

United States Patent
Jackson

(10) Patent No.: US 10,352,459 B2
(45) Date of Patent: Jul. 16, 2019

(54) SEAL ASSEMBLIES FOR USE WITH FLUID VALVES

(71) Applicant: FISHER CONTROLS INTERNATIONAL, LLC, Marshalltown, IA (US)

(72) Inventor: Trenton Frank Jackson, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 0 days.

(21) Appl. No.: 15/658,147

(22) Filed: Jul. 24, 2017

(65) Prior Publication Data

US 2019/0024804 A1 Jan. 24, 2019

(51) Int. Cl.
| F16K 1/46 | (2006.01) |
| F16K 25/00 | (2006.01) |
| F16K 1/42 | (2006.01) |
| F16J 15/18 | (2006.01) |
| F16K 3/24 | (2006.01) |
| F16K 3/26 | (2006.01) |

(52) U.S. Cl.
CPC ............ *F16K 1/465* (2013.01); *F16J 15/185* (2013.01); *F16J 15/186* (2013.01); *F16K 1/422* (2013.01); *F16K 1/46* (2013.01); *F16K 3/243* (2013.01); *F16K 3/246* (2013.01); *F16K 3/267* (2013.01); *F16K 25/005* (2013.01)

(58) Field of Classification Search
CPC ........ F16K 1/465; F16K 1/422; F16K 25/005; F16K 3/243; F16J 15/185; F16J 15/186

USPC .................................................. 251/176, 174
See application file for complete search history.

(56) References Cited

U.S. PATENT DOCUMENTS

| 4,073,308 A | | 2/1978 | Stith, Jr. | |
| 4,379,557 A | * | 4/1983 | Saka | ..................... F16K 41/023 137/72 |
| 4,911,408 A | * | 3/1990 | Kemp | .................... F16K 5/0673 251/174 |
| 5,190,264 A | * | 3/1993 | Boger | .................... F16J 15/186 251/214 |
| 5,313,976 A | * | 5/1994 | Beasley | ................ F16K 5/0636 137/15.22 |
| 8,702,056 B2 | * | 4/2014 | Crochet, Sr. et al. | .. F16K 27/00 251/214 |

(Continued)

FOREIGN PATENT DOCUMENTS

CN   203703179   7/2014

OTHER PUBLICATIONS

International Searching Authority, "International Search Report," issued in connection with International Patent Application No. PCT/US2018/040847, dated Sep. 27, 2018, 7 pages.

(Continued)

*Primary Examiner* — Kevin L Lee

(74) *Attorney, Agent, or Firm* — Hanley Flight & Zimmerman, LLC

(57) ABSTRACT

Seal assemblies for use with fluid valves are disclosed. An apparatus includes a valve plug having a first annular shoulder adjacent an end of the valve plug, a seal disposed on the first annular shoulder, and a fastener at the end of the valve plug to force the seal against the first annular shoulder to apply a load to the seal.

22 Claims, 5 Drawing Sheets

(56) References Cited

U.S. PATENT DOCUMENTS

| | | |
|---|---|---|
| 8,820,708 B2* | 9/2014 | Bell ........................ F16K 3/246 |
| | | 251/282 |
| 9,267,604 B2 | 2/2016 | Bell |
| 2006/0048826 A1 | 3/2006 | Gossett et al. |
| 2013/0248751 A1* | 9/2013 | Anderson ............... F16K 1/465 |
| | | 251/359 |
| 2014/0014865 A1 | 1/2014 | Anderson |
| 2017/0045147 A1 | 2/2017 | Mann, III et al. |

OTHER PUBLICATIONS

International Searching Authority, "Written Opinion," issued in connection with International Patent Application No. PCT/US2018/040847, dated Sep. 27, 2018, 7 pages.

* cited by examiner

SEAL ASSEMBLIES FOR USE WITH FLUID VALVES

FIELD OF THE DISCLOSURE

This disclosure relates generally to seal assemblies and, more particularly, to seal assemblies for use with fluid valves.

BACKGROUND

Valves are commonly used in process control systems to control the flow of process fluids. Linear valves (e.g., a gate valve, a globe valve, a diaphragm valve, a pinch valve, etc.) typically have a closure member (e.g., a valve plug) disposed in a fluid path. A valve stem operatively couples the closure member to an actuator that moves the closure member between an open position and a closed position to allow or restrict the flow of fluid between an inlet and an outlet of the valve. Additionally, to achieve certain fluid flow characteristics, valves often employ a cage that interposes in the fluid flow path between the inlet and the outlet of the valve. A cage can reduce flow capacity, attenuate noise, and/or reduce or eliminate cavitation. Additionally, a cage surrounds the closure member to provide stability, balance, and alignment to the closure member.

To effect a seal of a closure member, the closure member typically includes a channel or groove that receives a seal that engages an inner surface of the cage. Typically, industrial process conditions such as pressure and temperature (e.g., super-heated steam applications) of the process fluids dictate the type of valve and valve components that may be used such as, for example, the types of seals that may be used to effect a seal of a closure member. For high temperature applications, flexible valve seals (e.g., an elastomeric seal) cannot be used due their inability to withstand high temperatures.

In high-temperature applications (e.g., greater than 450° F.), because of its resistance to high temperature, a carbon-fiber sealing ring may be used. However, because of its brittle characteristic and lack of elasticity, a carbon-fiber seal cannot be installed intact and must be broken into pieces prior to being installed in a groove of the closure member. The fractured mating ends of the sealing ring pieces may ultimately cause undesired leakage. Additionally, the pressure differential of the fluid between the inlet and the outlet of the valve is used to pressure assist or load the seal against the sealing surface (i.e., the groove of the closure member) to effect a seal of the closure member. However, during low pressure conditions, the fluid pressure may be insufficient to pressure assist the seal against the sealing surface, thereby causing undesired leakage through the valve.

SUMMARY

An example apparatus disclosed herein includes a valve plug having a first annular shoulder adjacent an end of the valve plug. The apparatus also includes a seal disposed on the first annular shoulder. The apparatus also includes a fastener at the end of the valve plug to force the seal against the first annular shoulder to apply a load to the seal.

Another example apparatus includes a valve plug having a first portion having a first diameter and a second portion having a second diameter smaller than the first diameter. The apparatus also includes a circumferential seal disposed on the second portion. The apparatus also includes a fastener at an end of the valve plug adjacent the first portion, the fastener to apply a load to the seal.

Another example apparatus includes a valve plug having a seal gland. The apparatus also includes a stacked arrangement of seals disposed in the seal gland. The apparatus also includes means for biasing to maintain a load applied to the seals.

Figure 1:
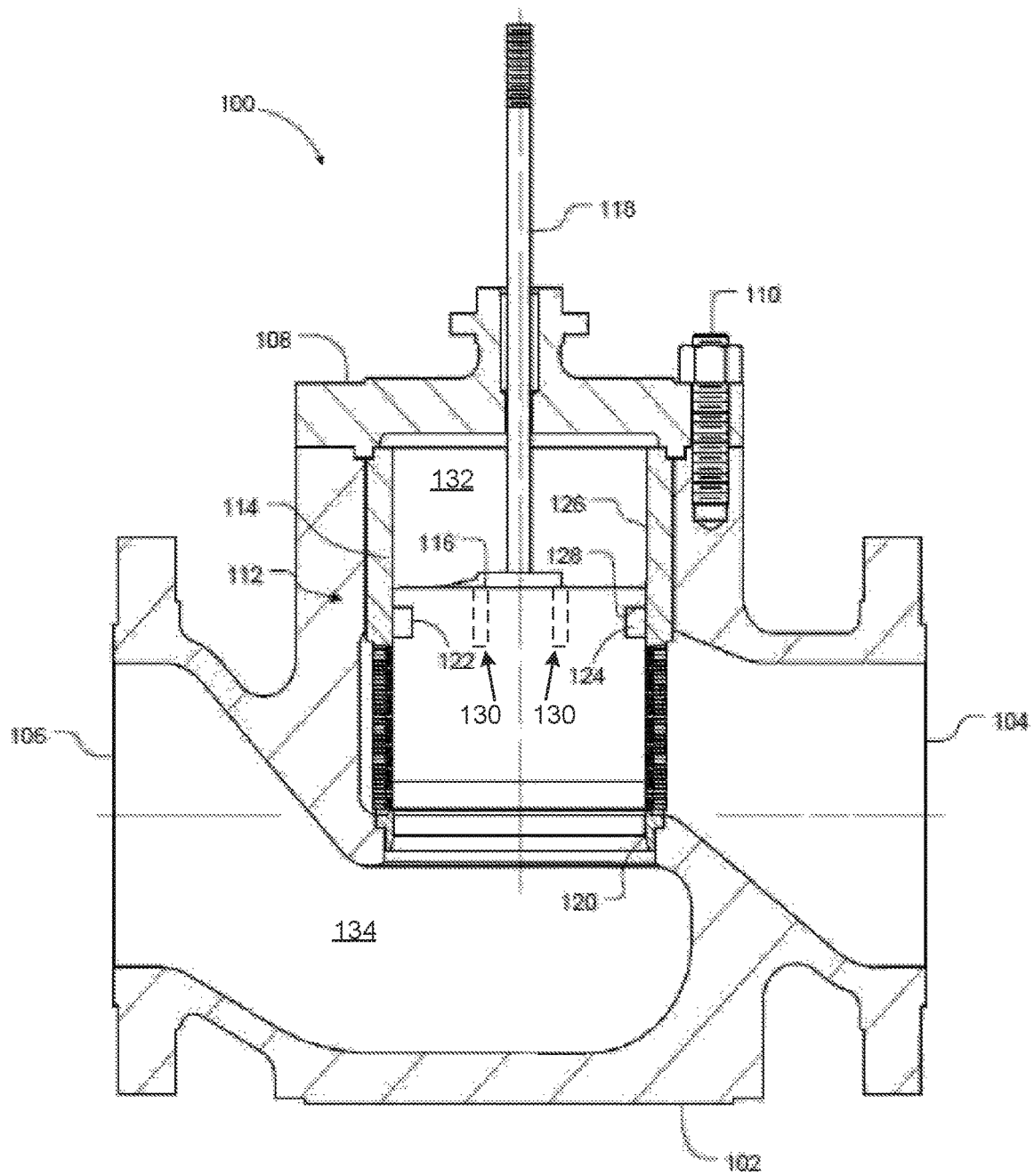
FIG. 1 is a cross-sectional view of a known valve.

The figures disclosed herein are not to scale. Wherever possible, the same reference numbers will be used throughout the drawings and accompanying written descriptions to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

A valve plug may use a seal (e.g., an O-ring) to prevent leakage of a process fluid (e.g., water, natural gas, etc.) past the valve plug during operation of a valve. The seal is typically composed of soft and/or hard material(s) (e.g., rubber, metal, graphite, etc.) depending on the operating conditions in which the seal is to function. In particular, seal materials may be selected based on a temperature, a pressure and/or a type of the process fluid that is to flow through the valve.

During certain fluid control applications (e.g., supplying feed water to a boiler), the valve plug may experience relatively high temperatures. Additionally, precipitate or particles within such process fluids (e.g., water) may degrade the seal of the valve plug. The valve plug seal can also deteriorate and/or wear due to friction caused by the seal sliding against a sealing surface, such as a wall of a cage within the valve (e.g., during stroking of the fluid valve). As a result, performance of the above known seals, valve plugs and/or fluid valves maybe adversely affected. For example, such degradation, deterioration and/or wear of the seal may cause a fluid valve to fail to achieve tight shut-off, incur costly repair(s) and/or require excessive maintenance for components contained therein.

The example seal assemblies described herein may be used with valves to prevent leakage of a process fluid (e.g., water, natural gas, etc.) past a valve plug during operation of a valve. The example seal assemblies disclosed herein substantially eliminate or prevent undesired leakage past a valve plug during operation and improve shut-off capabilities. In particular, the example seal assemblies include at least one seal (e.g., a graphite ring) disposed on an annular shoulder of a valve plug. The example seal assemblies described herein are particularly advantageous in high-temperature fluid applications because the example graphite seals described herein can be installed without having to break the seals into pieces during the installation of the seals, thereby reducing or substantially eliminating undesired leakage between the cage and closure member. Additionally or alternatively, the example seal assemblies described herein include a biasing element to provide a load to assist or bias the seal against the annular shoulder of the valve plug, thereby eliminating reliance on the pressure differential of the process fluid to pressure assist the seal against the annular shoulder of the valve plug.

Additionally or alternatively, the example seal assemblies may include a fastener that provides a load to bias the seal against the annular shoulder of the valve plug. In some examples, the fastener may load the biasing element (e.g., a Bellville spring, a coil spring, etc.) which, in turn, biases the seal against the annular shoulder of the valve plug. Therefore, the biasing element may provide a load to bias the seal against the annular shoulder of the valve plug despite the fastener loosening, for example.

In some examples, the seal assemblies may include a load ring positioned between the biasing element and the seal to distribute the load provided by the biasing element and/or the fastener. In some examples, the seal assemblies may also include scraper rings placed immediately above and below the seal. The scraper rings may have a slightly larger diameter than the seal to reduce friction between the seal and an inner surface of a cage and to deter the seal from extruding, for example. In some examples, the seal may comprise multiple seals (e.g., two graphite rings, three graphite rings, etc.). When there are multiple seals, the scraper rings may be placed between the individual seals, for example.

FIG. 1 illustrates a cross-sectional view of a known valve 100. The valve 100 illustrated in FIG. 1 includes a valve body 102 that defines a fluid flow passageway between an inlet 104 and an outlet 106. A bonnet 108 is coupled to the valve body 102 via fasteners 110, and a bonnet 108 couples the valve body 102 to an actuator (not shown). Although not shown, the bonnet 108 may house a packing system. Valve trim 112 disposed within the fluid flow passageway formed in the valve body 102 controls the flow of fluid between the inlet 104 and the outlet 106. The valve trim 112 includes internal components of the valve 100 such as, for example, a closure member, a valve seat, a cage, a stem, and a stem pin.

Referring to FIG. 1, to control fluid through the valve body 102, a cage 114 is disposed between the inlet 104 and the outlet 106 to impart certain flow characteristics to the fluid (e.g., reduce noise and/or cavitation generated by the flow of fluid through the valve 100). The cage 114 can include various designs to provide certain fluid flow characteristics to suit the needs of a particular control application. For example, the cage 114 may be configured to provide a particular fluid flow versus pressure drop characteristic. The cage 114 can also facilitate maintenance, removal, and/or replacement of the other components of the valve trim 112. In the illustrated example, the cage 114 is a substantially unitary structure. However, in other example implementations, the cage 114 can be a two-piece structure that includes an upper portion removably coupled to a lower portion.

A closure member 116 (e.g., a plug) has an outer surface sized to closely fit within the cage 114 so that the closure member 116 is slidable within the cage 114. A stem 118 operatively couples the closure member 116 to an actuator stem (not shown) which, in turn, couples the closure member 116 to an actuator (not shown). In operation, an actuator (e.g., a pneumatic actuator) drives the valve stem 118 and, thus, the closure member 116 between a closed position at which the closure member 116 is in sealing engagement with a valve seat 120 (e.g., a seat ring) to restrict the flow of fluid through the valve 100 to a fully open or maximum flow rate position at which the closure member 116 is away from the valve seat 120 to allow the flow of fluid through the valve 100.

The closure member 116 includes a channel or groove 122 to receive a seal 124 that engages an inner surface 126 of the cage 114 to prevent fluid from leaking between the cage 114 and closure member 116. For high temperature applications, seals made of elastomeric materials cannot be used due to their lack of resistance to high temperatures. For example, an increase in operating temperature may permanently deform or damage an elastomeric seal, thereby creating undesired leakage between the cage 114 and the closure member 116.

A carbon-fiber seal may be used in high-temperature applications to withstand high-temperature fluid. However, because of its brittle characteristic and lack of elasticity, the carbon-fiber seal must be broken into pieces and installed in the groove 122 of the closure member 116. The broken pieces create jagged edges that matably engage when the broken pieces are installed in the groove 122 of the closure member 116. If the jagged edges are not aligned properly, the broken edges can disengage during high-pressure conditions and may cause undesired leakage between the closure member 116 and the inner surface 126 of the cage 114. Additionally, a carbon-fiber seal is typically pressure assisted against a sealing surface 128 of the closure member 116 and the inner surface 126 of the cage 114 by the pressure differential of the fluid as the fluid travels from the inlet 104 to the outlet 106 of the valve 100. To pressure assist the seal 124 against the sealing surface 128, the closure member 116 includes balance ports 130 (shown as dashed lines). For example, when the closure member 116 engages the valve seat 120 (e.g., via a closure operation), a fluid pressure of a first space 132 may change (e.g., increase and/or decrease) relative to a fluid pressure of a second space 134. As a result, the pressurized fluid flows through the balance ports 130, thereby balancing or equalizing the fluid pressure between the first space 132 and the second space 134. This pressure difference is used to maintain the seal 124 in a compressed condition. However, during low pressure events, the fluid pressure between the first space 132 and the second space 134 may not be able to maintain the seal 124 in the compressed condition. Therefore, in low-pressure situations, fluid pressure may be insufficient to effectively load the seal 124 against the sealing surface 128, thereby causing undesired leakage through the valve 100.

Figure 2:
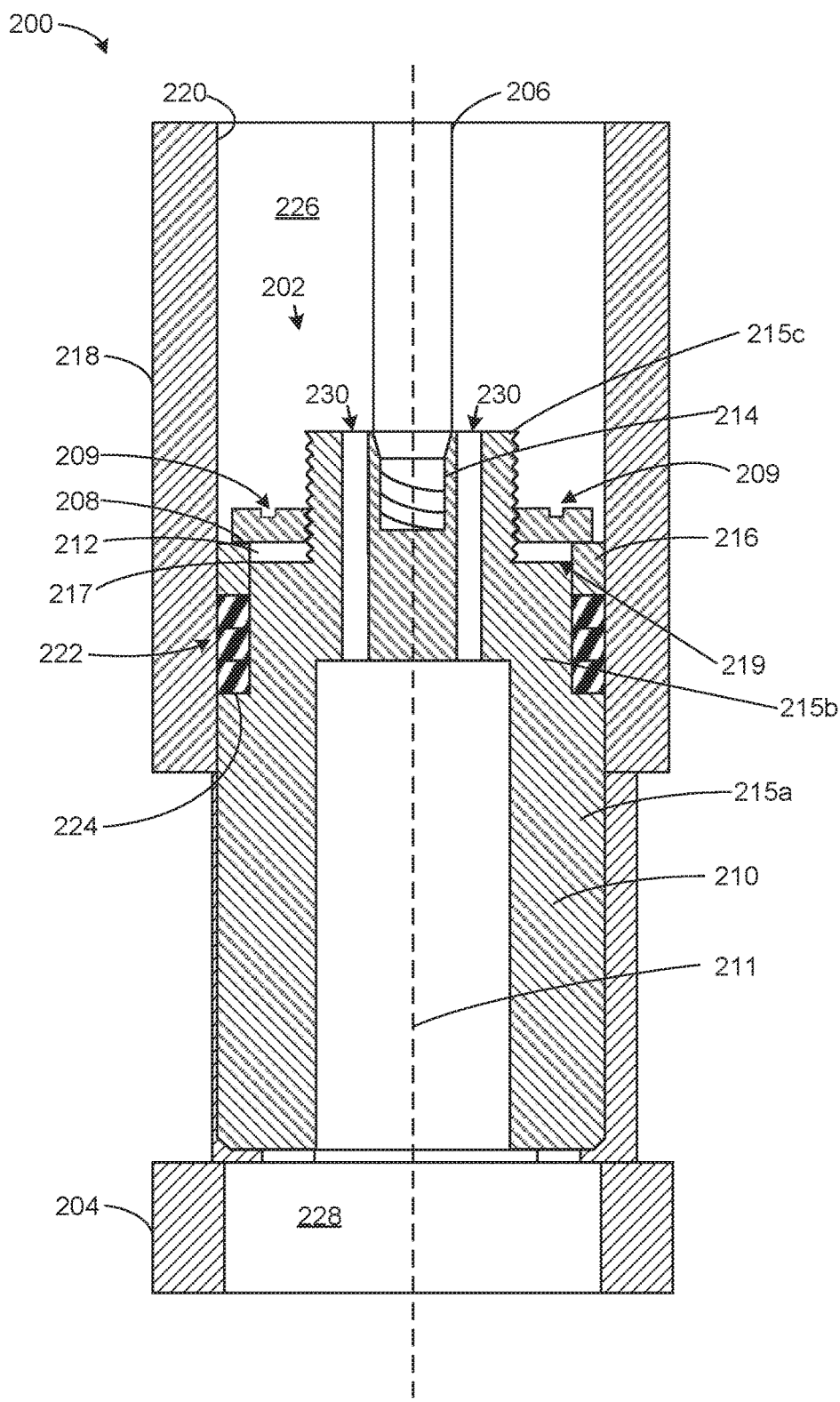
FIG. 2 is a detailed cross-sectional view of an example fluid valve and shows an example fluid flow control member in accordance with the teachings of this disclosure.

FIG. 2 is a detailed cross-sectional view of an example fluid valve 200 and shows a fluid flow control member 202 in accordance with the teachings of this disclosure. According to the illustrated example, the fluid flow control member 202 may be any suitable type of valve plug (e.g., a cylindrical plug, a conical plug, a tapered plug, etc.) that varies the flow of a process fluid through the fluid valve 200 when moved relative to (e.g., toward or away from) a valve seat 204. In particular, a stem 206 causes the fluid flow control member 202 to move along a vertical direction (in the orientation of FIG. 2) between an open position and a closed position. When the fluid flow control member 202 is in the closed position, the fluid flow control member 202 contacts and/or sealingly engages the valve seat 204, thereby significantly reducing or preventing flow of the process fluid through the fluid valve 200. Conversely, when the fluid flow control member 202 is in the open position as shown in FIG. 2, the fluid flow control member 202 is separated from the valve seat 204, which enables the flow of the process fluid through the fluid valve 200.

According to the illustrated example, the fluid flow control member 202 has a fastener 208 and a valve plug 210 such that a gap (e.g., a uniform or non-uniform gap) 212 is provided between the fastener 208 and the valve plug 210. In the illustrated example, the stem 206 is threadably coupled to an aperture 214 of the valve plug 210. In the illustrated example, the valve plug 210 includes a first portion 215a having a first diameter, a second portion 215b having a second diameter, and a third portion 215c having a third diameter. In the illustrated example, the first diameter is larger than the second diameter, and the second diameter is larger than the third diameter.

Figure 4:
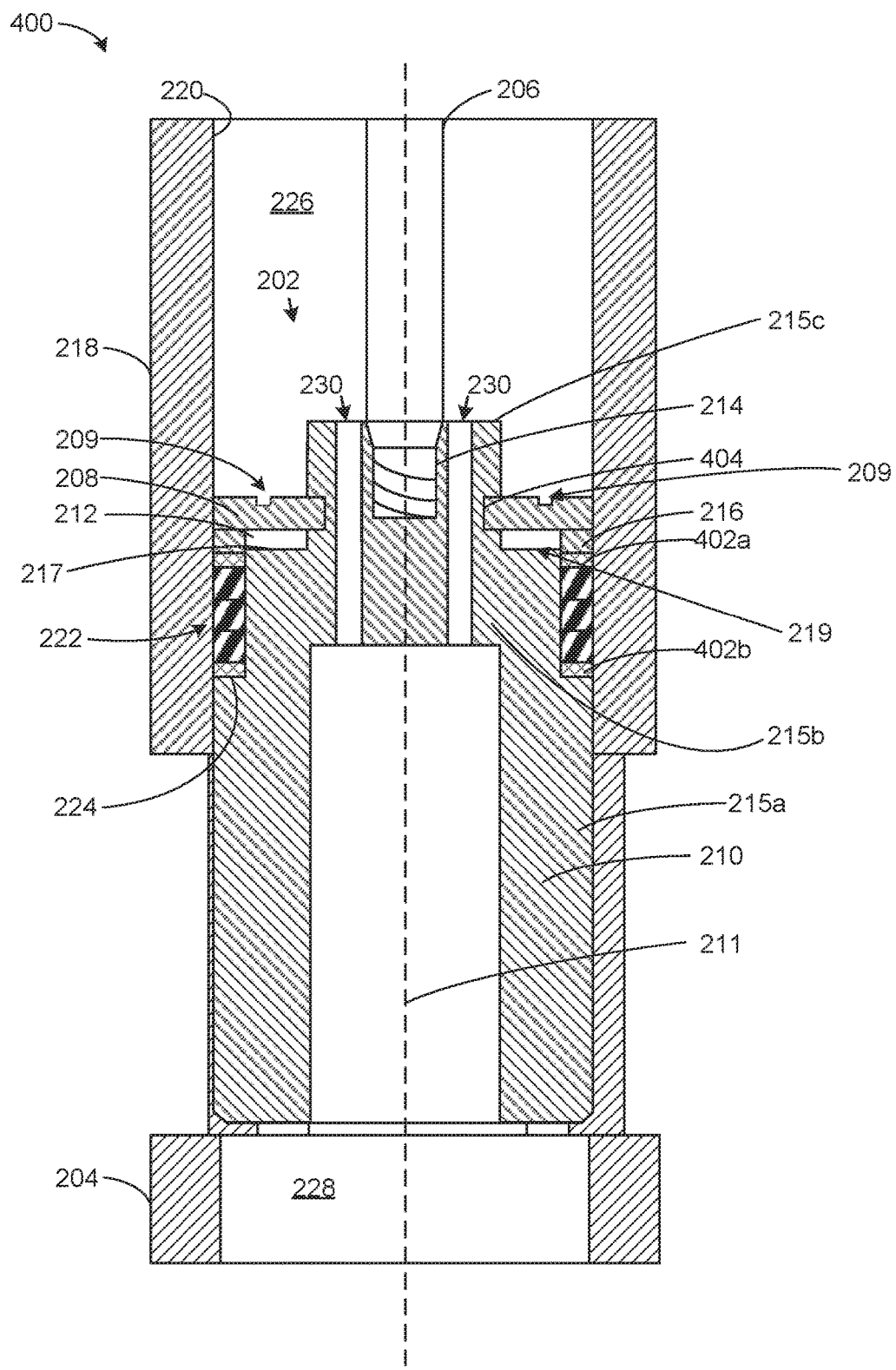
FIG. 4 is a detailed cross-sectional view of another alternative configuration of the example fluid valve and the example fluid flow control member of FIG. 2 in accordance with the teachings of this disclosure.
Figure 5:
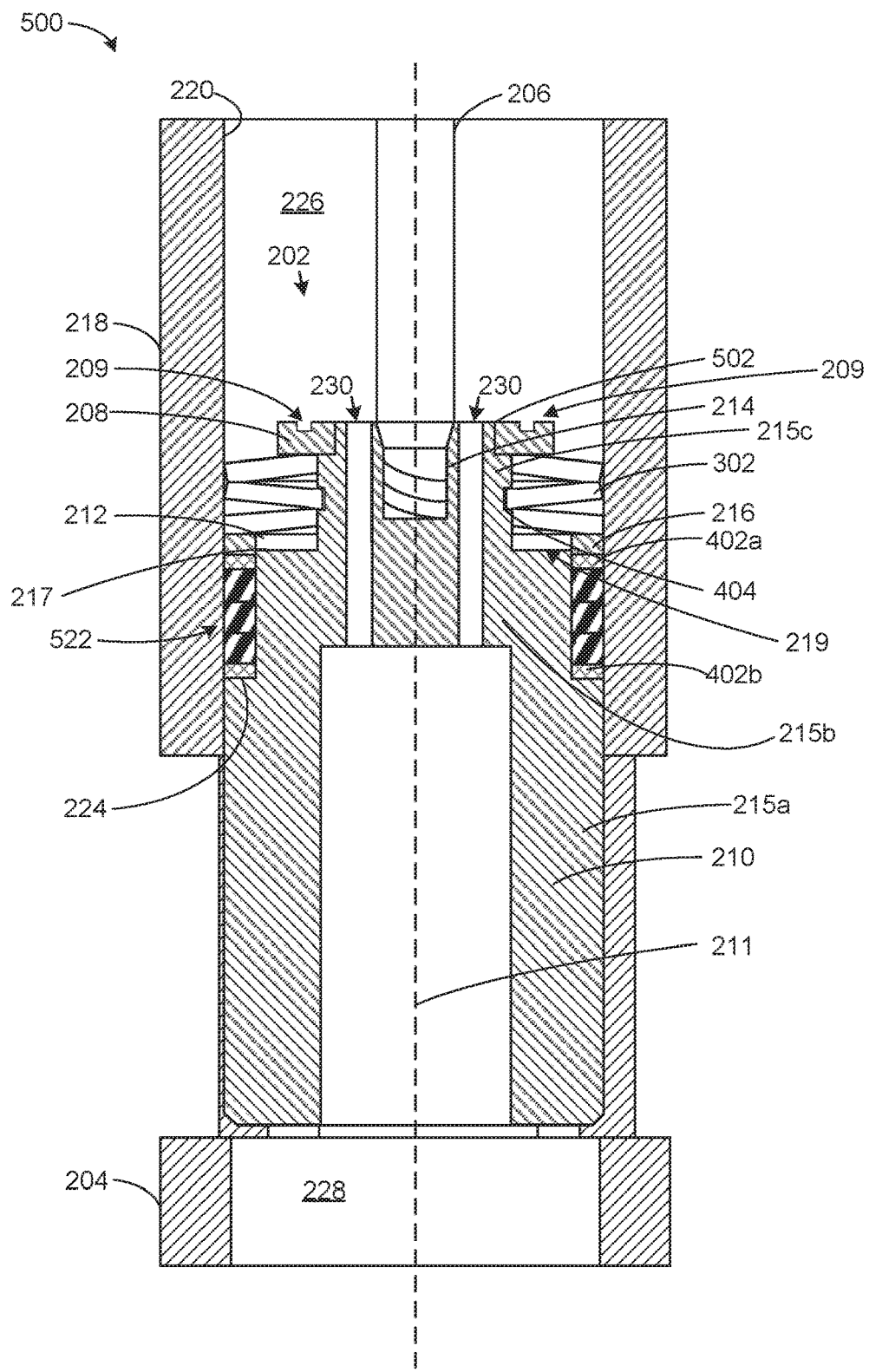
FIG. 5 is a detailed cross-sectional view of another alternative configuration of the example fluid valve and the example fluid flow control member of FIGS. 3 and 4 in accordance with the teachings of this disclosure.

The fastener 208 is threadably coupled to the valve plug 210 to allow the fastener 208 to move relative to the valve plug 210. Thus, in this example, the fastener 208 is a threaded fastener (e.g., a nut). In the illustrated example, the fastener 208 includes example apertures 209 that may be utilized to align and urge the fastener 208 towards the valve plug 210 during assembly (e.g., screwing the fastener 208 onto the valve plug 210). Alternatively or additionally, the fastener 208 may be hexagonal in shape or have any other shape to receive a tool to facilitate the turning of the fastener 208 to urge the fastener 208 towards the valve plug 210 during assembly, for example. However, the fastener 208 may be coupled to the valve plug 210 by any other coupling means, such as a snap fit connection, as shown in FIGS. 4 and 5. In some examples, the fastener 208 moves toward the valve plug 210 along a common longitudinal axis 211 to reduce and/or close the gap 212. In the illustrated example, a load ring 216 is disposed between the fastener 208 and the valve plug 210 to more evenly distribute a load applied by the fastener 208 to a seal 222 disposed on a first annular shoulder 224 of the valve plug 210. Additionally, the load ring 216 may be dimensioned to control a size of the gap 212 to ensure that the fastener 208 does not contact (e.g., bottom out) against a surface 217 of a second annular shoulder 219 of the valve plug 210.

According to the illustrated example, the fluid valve 200 has a cage 218 for guiding movement of the valve plug 210 of the flow control member 202. Specifically, the cage 218 aligns the valve plug 210 relative to the common longitudinal axis 211 and provides stability to the valve plug 210 as the valve plug 210 moves. As shown in FIG. 2, a wall (e.g., an inner circumferential wall) 220 of the cage 218 surrounds the fluid flow control member 202 and slidably engages the valve plug 210. Additionally, the outer surface of the fastener 208 may be sized and shaped to slidably engage the wall 220 of the cage 218.

The seal 222 of the illustrated example is disposed on the first annular shoulder 224 of the valve plug 210 between the wall 220 of the cage 218 and the valve plug 210. The seal 222 can be an O-ring, graphite rings, etc. In the illustrated example, the seal 222 is composed of three graphite rings. However, any number of seal rings may be used (e.g., one seal ring, two seal rings, etc.). The seal 222 of the illustrated example has a rectangular cross-section. However, other cross-sectional geometries may be used instead.

During assembly, the valve plug 210 is installed in the cage 218 without the fastener 208, the load ring 216, or the seal 222. After the valve plug 210 is installed in the cage 218, the seal 222 is disposed on the first annular shoulder 224 followed by the load ring 216. The fastener 208 is then placed on the valve plug 210 and the apertures 209 may be used to rotate (i.e., tighten) the fastener 208 to urge the fastener 208 toward the valve plug 210 and provide a force to the load ring 216. In some examples, when the load ring 216 abuts the surface 217 of the valve plug 210, the fastener 208 may be staked to maintain the fastener 208 and the seal 222 in a compressed condition. However, any other locking technique may be utilized to deter the fastener 208 from loosening.

For the purpose of balancing the fluid pressure between a first space 226 adjacent the fluid flow control member 202 and a second space 228 adjacent the fluid flow control member 202, the fluid flow control member 202 of the illustrated example has balance port(s) 230 extending therethrough along the common longitudinal axis 211. In this example, the fluid flow control member 202 is positioned between the first space 226 and the second space 228.

The balance port(s) 230 of the illustrated example convey the pressurized fluid within the fluid valve 200 between the first space 226 and the second space 228, which provides stability to the fluid flow control member 202 when it is in the closed position and/or moves relative to the valve seat 204. For example, when the valve plug 210 engages the valve seat 204, a fluid pressure of the second space 228 may change (e.g., increase and/or decrease) relative to a fluid pressure of the first space 226. The examples disclosed herein maintain the seal 222 in the compressed condition throughout low pressure and high pressure events to avoid leakage. Thus, in contrast to FIG. 1, the seal 222 is maintained in the compressed condition when the fluid flow control member 202 is in the open position (e.g., the valve plug 210 does not engage the valve seat 204) and when the fluid control member 202 is in the closed position (e.g., the valve plug 210 engages the valve seat 204).

Figure 3:
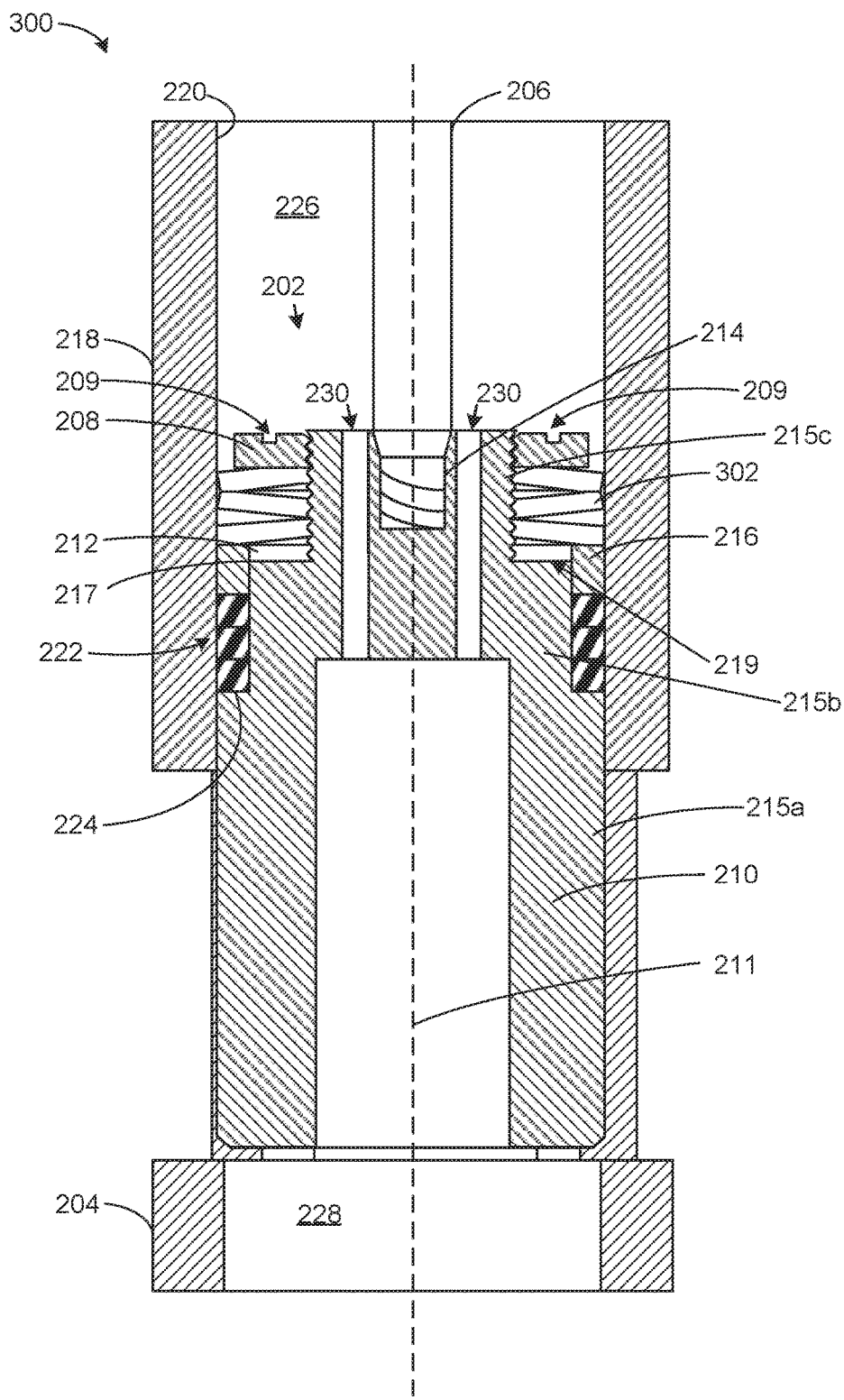
FIG. 3 is a detailed cross-sectional view of an alternative configuration of the example fluid valve and the example fluid flow control member of FIG. 2 in accordance with the teachings of this disclosure.

FIG. 3 is a detailed cross-sectional view of an alternative configuration 300 of the example fluid valve 200 and the example fluid flow control member 202 of FIG. 2. The alternative configuration 300 operates in a similar manner as the fluid valve 200. However, in contrast to the example fluid valve 200 of FIG. 2, a biasing element 302 (e.g., a Bellville spring, a coil spring, etc.) is provided between the fastener 208 and the load ring 216 to maintain the seal 222 in the compressed condition. To maintain the seal 222 in the compressed condition, the fastener 208 provides a force to urge the biasing element 302 toward the valve plug 210. The biasing element 302 urges the load ring 216 toward the valve plug 210 and the load ring 216, in turn, increases a load on the seal 222. The biasing element 302 may facilitate maintenance of a load on the seal 222 as dimensions of components of the valve 300 change in response to temperature changes, wear and/or loosening of the fastener 208.

FIG. 4 is a detailed cross-sectional view of another alternative configuration 400 of the example fluid valve 200 and the example fluid flow control member 202 of FIG. 2. The alternative configuration 400 operates in a similar manner as the fluid valve 200. However, in contrast to the example fluid valve 200 of FIG. 2, the fastener 208 is coupled to the valve plug 210 via a snap fit connection. Additionally, scraper rings 402a-b are provided between the load ring 216 and the seal 222, and the seal 222 and the first annular shoulder 224. In the illustrated example, the fastener 208 is coupled to the valve plug 210 via a groove 404. During assembly, the fastener 208 may be urged toward the valve plug 210 until the fastener 208 snaps into the groove 404 to maintain the seal 222 in the compressed condition. In the illustrated example, the scraper rings 402 have a slightly larger diameter than the seal 222 to prevent debris from contacting the seal 222 and to deter the seal 222 from extruding. In the example of FIG. 2, when the valve plug 210 moves relative to the cage 218, the seal 222 may rub against the wall 220 of the cage 218. As such, when debris is present, the seal 222 may break apart and/or deteriorate. To maintain the life of the seal 222, the scraper rings 402 are provided to prevent debris from contacting the seal 222. Thus, when the valve plug 210 moves relative to the cage 218, the scraper rings 402 engage the wall 220 and prevent debris from contacting the seal 222, extending the life of the seal 222 and avoiding leakage.

FIG. 5 is a detailed cross-sectional view of another alternative configuration 500 of the example fluid valve 200 and the example fluid flow control member 202 of FIGS. 3 and 4. The alternative configuration 500 operates in a similar manner as the fluid valve 200 of FIGS. 3 and 4. However, in contrast to the example fluid valve 200 of FIGS. 3 and 4, the valve plug 210 includes a second groove 502, and the biasing element 302 and the scraper rings 402 are used in combination to extend the life of the seal 222. During assembly, either groove 404 or 502 may be utilized to urge the biasing element 302 toward the valve plug 210. In the illustrated example, the fastener 208 is coupled to the valve plug 210 via the groove 502. However, to increase the force on the seal 222 the fastener may be urged toward the valve plug 210 and coupled to the valve plug via the groove 404. In the illustrated example, the biasing element 302 is positioned between the fastener 208 and the load ring 216. The scraper rings 402 are positioned between the load ring 216 and the seal 222, and between the seal 222 and the first annular shoulder 224. The fastener 208 provides a force to urge the biasing element 302 toward the valve plug 210. The biasing element 302 urges the load ring 216 toward the valve plug 210 and the load ring 216, in turn, maintains a load on the seal 222 and the scraper rings 402. During operation, the scraper rings 402 prevent debris from contacting the seal 222, deter the seal 222 from extruding, and assist in maintaining the seal 222 in the compressed condition. In some examples, the fastener 208 may loosen and the biasing element 302 may urge the load ring 216 toward the valve plug 210 to maintain the seal 222 in the compressed condition.

As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

From the foregoing, it will be appreciated that the above disclosed apparatus enable a seal to be maintained in a compressed condition within a fluid valve. By enabling the seal to be maintained in the compressed condition, examples disclosed herein provide a tight shut-off of the fluid valve while greatly reducing and/or eliminating friction experienced by the seal and, thus, any wear, deterioration and/or degradation of the seal that would have otherwise occurred. Additionally, the properties of graphite rings are desired for the seal because the graphite rings increase shut-off capabilities during high temperature events. Further, maintaining the seal in the compressed condition eliminates reliance on a pressure differential of process fluid to assist the seal against the valve plug. Therefore, examples disclosed herein may extend the life of the seal and/or prevent costly repairs and/or maintenance of the fluid valve and/or components contained therein.

An example apparatus includes a valve plug having a first annular shoulder adjacent an end of the valve plug; a seal disposed on the first annular shoulder; and a fastener at the end of the valve plug to force the seal against the first annular shoulder to apply a load to the seal.

In some examples, the apparatus includes a spring between the fastener and the seal to maintain the load. In some examples, the spring comprises a Bellville spring. In some examples, the apparatus includes a load ring between the fastener and the seal to distribute a force applied by the fastener to the seal. In some examples, the seal comprises one or more graphite rings. In some examples, the valve plug comprises a second annular shoulder between the end of the valve plug and the first annular shoulder, and further comprising a load ring in contact with the seal and a spring disposed between the load ring and the fastener and spaced from the second annular shoulder. In some examples, the fastener may be adjusted to urge the spring toward the second annular shoulder and the load ring to increase the load on seal. In some examples, the fastener may be adjusted when the a plug is installed in a valve cage. In some examples, the apparatus includes one or more scraper rings adjacent the seal.

An example apparatus includes a valve plug having a first portion having a first diameter and a second portion having a second diameter smaller than the first diameter; circumferential seal disposed on the second portion; and a fastener at an end of the valve plug adjacent the first portion, the fastener to apply a load to the seal.

In some examples, the valve plug has a third portion between the first and second portions, wherein the third portion has a third diameter smaller than the second diameter, and further comprising a bias member surrounding the third portion between the fastener and the seal, the bias member to maintain the load applied to the seal by the fastener. In some examples, the apparatus includes a load ring between the seal and the bias member to distribute the load applied to the seal. In some examples, the bias member comprises on or more springs. In some examples, the seal comprises stacked graphite rings. In some examples, the fastener is a threaded nut that is rotated to change the load applied to the seal. In some examples, the apparatus includes a scraper ring adjacent the seat to prevent debris from contacting the seal.

An example apparatus includes a valve plug having a seal gland; a stacked arrangement of seals disposed in the seal gland; and means for biasing to maintain a load applied to the seals.

In some examples, the apparatus includes means for distributing the load on the seals applied by the means for biasing. In some examples, the apparatus includes means for adjusting the load. In some examples, the means for adjusting is rotatable when the plug is installed in a cage to enable adjustment of the load.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a valve plug having a first annular shoulder adjacent an end of the valve plug;
    a seal disposed on the first annular shoulder between a wall of a valve cage and the valve plug; and
    a fastener at the end of the valve plug to force the seal against the first annular shoulder to apply a load to the seal.

2. The apparatus of claim 1, further comprising a spring between the fastener and the seal to maintain the load.

3. The apparatus of claim 2, wherein the spring comprises a Bellville spring.

4. The apparatus of claim 1, further comprising a load ring between the fastener and the seal to distribute a force applied by the fastener to the seal.

5. The apparatus of claim 1, wherein the seal comprises one or more graphite rings.

6. The apparatus of claim 1, wherein the valve plug comprises a second annular shoulder between the end of the valve plug and the first annular shoulder, and further comprising a load ring in contact with the seal and a spring disposed between the load ring and the fastener and spaced from the second annular shoulder.

7. The apparatus of claim 6, wherein the fastener may be adjusted to urge the spring toward the second annular shoulder and the load ring to increase the load on the seal.

8. The apparatus of claim 7, wherein the fastener may be adjusted when the valve plug is installed in the valve cage.

9. The apparatus of claim 1, further comprising one or more scraper rings adjacent the seal.

10. The apparatus of claim 1, wherein the fastener is threadably coupled to a portion of the valve plug.

11. The apparatus of claim 1, wherein the fastener is adjustable to reduce a gap between the fastener and the first annular shoulder of the valve plug.

12. An apparatus comprising:
    a valve plug having a first portion having a first diameter and a second portion having a second diameter smaller than the first diameter;
    a circumferential seal disposed on the second portion between a wall of a valve cage and the valve plug; and
    a fastener at an end of the valve plug opposite the first portion, the fastener to apply a load to the seal.

13. The apparatus of claim 12, wherein the valve plug has a third portion opposite the first portion, wherein the third portion has a third diameter smaller than the second diameter, and further comprising a bias member surrounding the third portion between the fastener and the seal, the bias member to maintain the load applied to the seal by the fastener.

14. The apparatus of claim 13, further comprising a load ring between the seal and the bias member to distribute the load applied to the seal.

15. The apparatus of claim 13, wherein the bias member comprises one or more springs.

16. The apparatus of claim 12, wherein the seal comprises stacked graphite rings.

17. The apparatus of claim 12, wherein the fastener is a threaded nut that is rotated to change the load applied to the seal.

18. The apparatus of claim 12, further comprising a scraper ring adjacent the seal to prevent debris from contacting the seal.

19. An apparatus comprising:
    a valve plug having a seal gland;
    a stacked arrangement of seals disposed in the seal gland between a wall of a valve cage and the valve plug; and
    means for biasing to maintain a load applied to the seals.

20. The apparatus of claim 19 further comprising means for distributing the load on the seals applied by the means for biasing.

21. The apparatus of claim 19 further comprising means for adjusting the load.

22. The apparatus of claim 21 wherein the means for adjusting is rotatable when the plug is installed in the valve cage to enable adjustment of the load.

* * * * *